United States Patent
Matsui et al.

[15] 3,657,086
[45] Apr. 18, 1972

[54] RACEMIZATION OF OPTICALLY ACTIVE TRANSCYCLOPROPANECARBOXYLIC ACIDS AND THEIR DERIVATIVES

[72] Inventors: Masanao Matsui, Tokyo; Kenzo Ueda, Nishinomiya, both of Japan

[73] Assignee: Sumitomo Chemical Company, Ltd., Osaka, Japan

[22] Filed: Mar. 16, 1970

[21] Appl. No.: 20,059

[30] Foreign Application Priority Data

Mar. 24, 1969 Japan..................................44/22559

[52] U.S. Cl. ..........................................204/158 R
[51] Int. Cl. ................................................B01j 1/10

[58] Field of Search ..............................204/158 R

[56] References Cited

UNITED STATES PATENTS 2,945,883  7/1960  Alberti et al. ..................204/158 R
3,533,931  10/1970  Becker..............................204/158 R Primary Examiner—G. L. Kaplan
Assistant Examiner—Neil A. Kaplan
Attorney—Stevens, Davis, Miller & Mosher

[57] ABSTRACT

A method for racemizing optically active trans-cyclopropanecarboxylic acids and their derivatives comprising dissolving the compound in an inert solvent which is transparent to ultraviolet rays and irradiating the solution with ultraviolet rays in the presence of a photo-sensitizer.

3 Claims, No Drawings

RACEMIZATION OF OPTICALLY ACTIVE TRANSCYCLOPROPANECARBOXYLIC ACIDS AND THEIR DERIVATIVES

The present invention relates to a method for racemizing optically active trans-cyclopropanecarboxylic acids and their derivatives into (±)-trans-cyclopropanecarboxylic acids and their derivatives.

In this invention, the cyclopropanecarboxylic acids include chrysanthemic acid, ethanochrysanthemic acid, [L. Velluz, J. Martel and G. Nomine, Comptes Rendus de Seances de L'academic des Sciences, 268, C–2199 (1969)], and acid derivatives thereof including esters, amides, salts and anhydrides.

The cyclopropanecarboxylic acids are an essential component of esters which are known generically as so-called pyrethroidal insecticides such as pyrethrin, allethrin, phthalthrin and the like useful as an insecticide having low toxicity and rapid effect, and there exists geometrical isomers (cis- and trans-isomers) and optical isomers thereof. Among these isomers, (±)-trans-esters have an insecticidal effect higher than those of (±)-cis-esters, and particularly, (+)-trans-ester shows a far higher effect compared with those of the other esters.

Accordingly, it is most important that the (+)-trans-cyclopropanecarboxylic acid is commercially prepared at a low cost.

It is well known to resolve (±)-trans-chrysanthemic acid to (+)-trans- and (−)-trans-chrysanthemic acids by using an optically active organic base such as quinine [Campbel and Harper: Journal of the Chemical Society, page 283 (1945) and Journal of the Science of Food and Agriculture, Vol. 3, page 189 (1952)]. (±)-trans-Ethanochrysanthemic acid may be also optically resolved by the similar method.

In this case, however, the obtained (+)-trans-cyclopropanecarboxylic acids can be used as it is for the production of an effective ester thereof, but far lower effective (−)-trans-cyclopropanecarboxylic acids are produced as a commercially useless by-product. Hence, it is most commercially significant that such a useless (−)-trans-cyclopropanecarboxylic acids would be converted to the useful (+)-trans- or (±)-trans-cyclopropanecarboxylic acids.

The present inventors have employed a unique photochemical technique to establish a method for almost completely racemizing the optically active trans-cyclopropanecarboxylic acids into (±)-trans-cyclopropanecarboxylic acids, and perfected the present invention.

It is an object of the present invention to provide a novel process for racemizing optically active trans-cyclopropanecarboxylic acids. It is another object to provide a method for racemizing (−)-trans-cyclopropanecarboxylic acids which are useless as an acid moiety of pyrethroids, into (±)-trans-cyclopropanecarboxylic acids. The other objects will be apparent from the following description.

The present invention provides a method for racemizing optically active trans-cyclopropanecarboxylic acids into (±)-trans-cyclopropanecarboxylic acids by irradiating them with ultraviolet rays in the presence of a photosensitizer. In carrying out the present invention, the optically active trans-cyclopropanecarboxylic acids are preferably dissolved in a solvent which is transparent to ultraviolet rays.

The solvent includes saturated hydrocarbons such as pentane, n-hexane, cyclohexane, petroleum benzin and ligroin, saturated ethers such as ethyl ether, isopropyl ether and tetrahydrofurane, benzene, alkylated benzenes such as toluene and xylene, alcohols such as methanol, ethanol, tert-butanol and propanols, water and a mixture thereof.

A photo-sensitizer is added to the solution. A compound having α-oxophenyl group may be employable as the photo-sensitizer. Acetophenone, propiophenone, butyrophenone, β-benzylpropionic acid or its salt, tetralone, 6-methoxytetralone and a mixture thereof are exemplified, but the present invention is, of course, not limited thereto.

The solution containing optically active trans-cyclopropanecarboxylic acid and the photo-sensitizer is irradiated with ultraviolet rays.

The irradiation may be conducted at a temperature of 0° to 90°C, preferably at 10° to 30°C.

The irradiation time is closely related to quantity and kind of the photo-sensitizer employed. Usually, the irradiation may be continued for several hours at a concentration of the photo-sensitizer of 1 to 30 percent by weight to the cyclopropanecarboxylic acid employed.

Thus, cyclopropanecarboxylic acids which have a small optical rotation and which contain chiefly (±)-trans-cyclopropanecarboxylic acids and a small amount of (±)-cis-cyclopropanecarboxylic acid, may be obtained as a resulting product.

If desired, the small amount of the (±)-cis-compound may be converted to (±)-trans-compound according to the conventional methods, one of which is disclosed in the specification of U.S. Pat. No. 3,046,229 (1958).

More concretely, the cis-compound is heated with potassium tert.-butoxide in tert.-butanol.

Further if desired, the resulting product may be treated with an acid catalyst such as boron trifluoride etherate to separate pure (±)-trans-cyclopropanecarboxylic acids.

As mentioned above, the optically active trans-cyclopropanecarboxylic acids can be easily racemized into (±)-trans-cyclopropanecarboxylic acids in a high yield.

The following examples are given in order to explain the present invention much in detail but not to limit the present invention thereto.

Example 1

8.4 grams of (−)-trans-chrysanthemic acid ($[\alpha]_D^{24}$: −14.1° (ethanol)) was dissolved in 270 ml of benzene and 0.6 g of isobutyrophenone was further added thereto and the solution was irradiated with 400 W high pressure mercury lamp at a temperature of 24° – 26° C for 6 hours. After evaporation of benzene, the residue was distilled under reduced pressure to obtain 7.5 g of fraction having a boiling point of 100° – 112° C (4 mm Hg). The fraction was dissolved in 30 ml of benzene and 0.5 ml of boron trifluoride etherate was further added and the resulting solution was left to stand still overnight to change the contained cis-chrysanthemic acid into lactone. The mixture was subjected to extraction with 5 percent aqueous sodium hydroxide solution, the extract was washed with ether and acidified with hydrochloric acid, the solution was subjected to extraction three times with respective 30 ml of ether, the combined ether layer was dried with anhydrous magnesium sulfate, and then evaporation of ether gave 5 g of light yellow liquid. The liquid readily crystallized by inoculating (±)-trans-chrysanthemic acid crystals. The resulting crystals were recrystallized from petroleum ether to obtain 3.6 g of crystals which have a melting point of 52° – 54° C and did not show a depression of melting point by mixed examination with (±)-trans-chrysanthemic acid, and 1.3 g of semicrystalline substance which showed an infrared absorption spectrum completely same as that of (±)-trans-chrysanthemic acid and showed $[\alpha]_D^{20}$: −2.61° (ethanol). On the other hand, the neutral portion and ether washings were mixed, and the mixture was dried with anhydrous magnesium sulfate. Evaporation of ether gave 2.4 g of light yellow liquid. The liquid readily crystallized by inoculating crystals of (±)-dihydrochrysanthemolactone. The crystals showed an infrared absorption spectrum completely same as that of authentic (±)-dihydrochrysanthemolactone and showed $[\alpha]_D^{24}$: 0.00°. The crystals were recrystallized from n-hexane to obtain 2.2 g of crystals which had a melting point of 51° – 52° C and did not show a depression of melting point by mixed examination with authentic (±)-dihydrochrysanthemolactone.

Example 2

6.0 grams of (−)-trans-chrysanthemic acid tert.-butyl ester ($[\alpha]_D^{20}$: +2.63° (ethanol)) was dissolved in 200 ml of benzene and 0.4 g of isobutyrophenone was further added and the solution was irradiated with 400 W high pressure mercury lamp at a temperature of 24° – 26° C for 6 hours. The ratio of cis-compound to trans-compound in the reaction mixture was about 35:65 from its gas chromatogram. The benzene in the reaction mixture was distilled off to obtain 6.3 g of light yellow liquid. The liquid was added to 30 ml of tertiary butanol dissolved with 1.1 g of metallic potassium and the mixture was heated under reflux for 8 hours. After distilling the tertiary butanol off, the reaction mixture was acidified with hydrochloric acid, subjected to extraction with ether, dried with anhydrous magnesium sulfate, and then the ether was distilled off. To the resulting crude reaction product, catalytic amount of p-toluenesulfonic acid and 20 ml of toluene were added and the mixture was heated under reflux for 3 hours. After cooling, the mixture was subjected to enough extraction with 5 percent aqueous solution of sodium carbonate. After washing the extract with a small amount of ether, the extract was acidified with hydrochloric acid and subjected to extraction with ether. The obtained extract was dried with anhydrous magnesium sulfate. The ether was distilled off and the remainder was distilled under reduced pressure to obtain 3.5 g of liquid having a boiling point of 115° – 117° C (5 mm Hg). The liquid readily crystallized by inoculating crystals of (±)-trans-chrysanthemic acid. The resulting crystals were recrystallized from petroleum ether to obtain 2.5 g of crystals which had a melting point of 52° – 54° C and did not show a depression of melting point by mixed examination with authentic (±)-trans-chrysanthemic acid, and 1.0 g of liquid which showed an infrared absorption spectrum completely same as that of (±)-trans-chrysanthemic acid and showed $[\alpha]_D^{20}$: –2.19° (ethanol).

Example 3

A mixture of 6.0 g of (–)-trans-chrysanthemic acid tert.-butyl ester and 0.4 g of acetophenone in 200 ml of tertiary butanol was irradiated with 400 W high pressure mercury lamp at a temperature of 24° – 26° C for 6 hours. The resulting reaction mixture was treated as in Example 2 to obtain 2.3 g of (±)-trans-chrysanthemic acid having a melting point of 52° – 54° C and 1.1 g of liquid which showed an infrared absorption spectrum completely same as that of (±)-trans-chrysanthemic acid and showed $[\alpha]_D^{20}$: –2.04° (ethanol).

Example 4

A mixture of 5.9 g of (–)-trans-chrysanthemic acid ethyl ester ($[\alpha]_D^{20}$: –9.77° (ethanol)) and 0.6 g of acetophenone in 200 ml of n-hexane was irradiated with 400 W high pressure mercury lamp for 5 hours. After distilling the n-hexane off, 6.5 g of light yellow liquid was obtained. To the liquid, 300 ml of tertiary butanol dissolved with 1.2 g of metallic potassium was added and the mixture was heated under reflux for 8 hours. The solvent was distilled off, the remainder was heated under reflux with 10 percent methanolic caustic soda solution for 8 hours, the metanol was distilled off, water was added, the mixture was acidified with hydrochloric acid and subjected to enough extraction with ether, the extract was dried with anhydrous magnesium sulfate, the ether was distilled off, 20 ml of benzene and 0.3 ml of boron trifluoride etherate were added, and the mixture was heated under reflux for 1 hour. After cooling, a small amount of water was added to the resulting mixture, the mixture was dried with anhydrous magnesium sulfate after well mixing, the benzene was distilled off, and the remainder was distilled under reduced pressure to obtain 4.1 g of liquid having a boiling point of 114° – 118° C (5 mm Hg). The liquid was dissolved in ether, subjected to extraction with 5 percent caustic soda aqueous solution, the extract was washed with a small amount of ether, acidified with hydrochloric acid and subjected to extraction with ether, the resultant extract was dried with anhydrous magnesium sulfate, and the ether was distilled off to obtain 3.6 g of light yellow liquid. The liquid readily crystallized by inoculating crystals of (±)-trans-chrysanthemic acid. The resulting crystals showed an infrared absorption spectrum completely same as that of (±)-trans-chrysanthemic acid and showed $[\alpha]_D^{20}$: –0.64°.

Example 6

A mixture of 5.0 g of (–)-trans-chrysanthemic acid amide ($[\alpha]_D^{24}$: –11.02° (ethanol)) and 0.4 g of isobutyrophenone in 270 ml of benzene was irradiated with 400 W high pressure mercury lamp for 6 hours. After distilling the benzene off from the reaction mixture, the crude product was heated under reflux for 18 hours with 20 ml of ethylene glycol containing 4.5 g of caustic potash and 3 ml of water. After cooling, 150 ml of water was added to the reaction mixture, the mixture was washed two times with ether, acidified with hydrochloric acid and subjected to extraction four times with benzene, the extract was dried with anhydrous magnesium sulfate, and the benzene was distilled off. To the remainder, 15 ml of benzene and 0.3 ml of boron trifluoride etherate were further added and the resulting mixture was left to stand still overnight. The mixture was subjected to extraction with 5 percent aqueous sodium carbonate solution, the extract was washed with a small amount of ether, acidified with hydrochloric acid and subjected to extraction with ether, the resulting extract was dried with anhydrous magnesium sulfate and treated with active carbon, and the ether was distilled off to obtain 3.4 g of liquid. The liquid readily crystallized by inoculating crystals of (±)-trans-chrysanthemic acid and showed an infrared absorption spectrum completely same as that of authentic (±)-trans-chrysanthemic acid and showed $[\alpha]_D^{24}$: –0.61° (ethanol).

Example 6

8.4 grams of (–)-trans-chrysanthemic acid ($[\alpha]_D^{24}$: –14.1° (ethanol)) was dissolved in 300 ml of 80 percent ethanol and to the resulting mixture, 5.6 g of triethylamine was added to obtain a salt. After adding 0.9 g of β-benzoylpropionic acid as a photo-sensitizer to the obtained mixture, it was irradiated with 400 W high pressure mercury lamp at a temperature of 20° – 25° C for 6 hours. The resulting mixture was acidified with hydrochloric acid and extracted with ether, the ether was distilled off, and the remainder was distilled under reduced pressure to obtain 7.9 g of fraction having a boiling point of 100° – 105° C (4 mm Hg). The fraction was treated as in Example 1 to obtain 3.4 g of crystals which had a melting point of 52° – 54° C and did not show a depression of melting point by mixed examination with authentic (±)-trans-chrysanthemic acid, 1.6 g of oily substance which showed an infrared absorption spectrum completely same as that of authentic (±)-trans-chrysanthemic acid and showed $[\alpha]_D^{21}$: –2.70° (ethanol) and 2.0 g of dihydrochrysanthemolactone which had a melting point of 51° – 52° C and showed $[\alpha]_D^{21}$: 0.00°.

Example 7

2.0 grams of (–)-trans-ethanochrysanthemic acid ($[\alpha]_D^{24}$: –12.87° (ethanol)) was dissolved in 250 ml of benzene and 0.20 g of isobutyrophenone was further added and the solution was irradiated with 400 W high pressure mercury lamp at a temperature of 20° C for 6 hours. The mixture was treated as in Example 1 to give 1.2 g of crystalline acid ($[\alpha]_D^{24}$: –0.63° (ethanol)) of which infrared absorption spectrum was identical with that of authentic (±)-trans-ethanochrysanthemic acid. Recrystallization of the product from petroleum ether gave pure (±)-trans-ethanochrysanthemic acid having a melting point of 58° – 59° C.

What is claimed is:

1. A process for racemizing optically active trans-cyclopropanecarboxylic acids, which comprises dissolving the optically active trans-cyclopropanecarboxylic acids in a solvent which is transparent to ultraviolet rays, irradiating the solution with ultraviolet rays in the presence of a photo-sensitizer having an α-oxophenyl group, recovering the resulting product and treating the resulting product to convert cis-cyclopropanecarboxylic acids contained in the resulting product into trans-cyclopropanecarboxylic acids.

2. A process according to claim 1 wherein the amount of the photo-sensitizer is 1 to 30 percent by weight based on the weight of the cyclopropanecarboxylic acids.

3. A process according to claim 1, wherein the trans-cyclopropanecarboxylic acids are trans-chrysanthemic acid, trans-ethanochrysanthemic acid or acid derivatives thereof.

* * * * *